United States Patent
Mancini et al.

(10) Patent No.: US 7,024,383 B1
(45) Date of Patent: Apr. 4, 2006

(54) ONLINE SALES RISK MANAGEMENT SYSTEM

(75) Inventors: Robert S. Mancini, Bedford, NY (US); Daniel J. Rothman, New York, NY (US); Mark Higgins, New York, NY (US); John Henry Godfrey, New York, NY (US); Paul M. Young, New York, NY (US); Arun M. Gunewardena, New York, NY (US); Sharon Greener, Rumson, NJ (US); Effie Konstantine Anagnostopoulos, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 09/526,606

(22) Filed: Mar. 16, 2000

Related U.S. Application Data

(60) Provisional application No. 60/179,373, filed on Jan. 31, 2000.

(51) Int. Cl.
G06F 16/60 (2006.01)
(52) U.S. Cl. .............................. 705/35; 705/38; 705/37
(58) Field of Classification Search ................. 705/35, 705/37, 38
See application file for complete search history.

(56) References Cited

U.S. PATENT DOCUMENTS

| | | | | |
|---|---|---|---|---|
| 5,262,942 | A | * | 11/1993 | Earle ............................ 705/35 |
| 5,557,518 | A | * | 9/1996 | Rosen ......................... 235/375 |
| 5,787,402 | A | * | 7/1998 | Potter et al. ................... 705/37 |
| 5,884,274 | A | | 3/1999 | Walker et al. ................. 705/4 |

(Continued)

OTHER PUBLICATIONS

Currenex web site, <http://www.currenex.com>; Homepage, <http://www.currenex.com/home.html> Foreign Exchange Market, <http://www.currenex.com/foreign.html> About Currenex, <http://www.currenex.com/about.html> FAQ, <http://www.currenex.com/faq.html> FX Trades Services, <Trades Services, <http://www.currenex.com/services.-html>.

"Netscape, Citibank Unveil Credit Card", Dow Jones News Service, Jan. 19, 2000.

Power, Carol, "AOL Digs Deeper Into Virtual Financial World", The American Banker, Aug. 11, 1999, On-line Banking 1.

(Continued)

*Primary Examiner*—Alain L. Bashore
(74) *Attorney, Agent, or Firm*—Lee & Hayes, PLLC

(57) ABSTRACT

A computer-implemented method for providing risk management for online transactions. An exchange price for a foreign currency relative to a base currency is entered into a host computer. The host computer will also receive data descriptive of one or more transactions involving the foreign currency that occurred within a predetermined time period. The data will include a transaction amount. Currency is exchanged according to the entered price and the transaction amounts contained in the data. A risk exposure for the predetermined time period can be calculated based upon an aggregate amount of currency involved in transactions during the predetermined time period. The risk exposure can be based upon market data relating to the price of the foreign currency. The present invention can be implemented to capture each transaction amount that relates to a sale occurring on an e-commerce site. Currency is automatically exchanged at the price entered for the local currency. Transactions can include an online sales transaction consummated over a computerized communications network, a retail transaction between a business and a retail customer, a business to business transaction, an online auction transaction or any other quantifiable transaction.

8 Claims, 7 Drawing Sheets

U.S. PATENT DOCUMENTS 5,897,621 A      4/1999   Boesch et al. ................. 705/26
5,963,923 A  *  10/1999   Garber ........................ 235/379
5,969,974 A  *  10/1999   Vandenbelt et al. ......... 235/435
6,014,627 A  *   1/2000   Togher et al. ................. 705/1
6,205,433 B1 *   3/2001   Boesch et al. ................. 705/26
6,249,770 B1 *   6/2001   Erwin et al. .................. 705/10
6,269,345 B1 *   7/2001   Riboud ........................ 705/35
6,317,727 B1 *  11/2001   May ............................ 705/36

OTHER PUBLICATIONS

Rogerson, Paul, "The Right to Choose", The Accountant, Aug. 1, 1999, 12.

Tompor, Susan, "Does it Make Sense to Spread the Wealth Around?", The Florida Times-Union, Jul. 11, 1999, H1.

International Search Report for PCT/US01/21812 dated Oct. 18, 2001.

* cited by examiner

ONLINE SALES RISK MANAGEMENT SYSTEM

CROSS REFERENCE TO RELATED APPLICATIONS

This application claims the benefit of provisional application entitled "Retail System Currency Exchange," filed Jan. 31, 2000, bearing the Ser. No. 60/179,373 the contents of which are relied upon and incorporated by reference.

BACKGROUND

The present invention relates generally to an on-line sales system. In particular, the present invention relates to a method-end system for managing risk associated with transacting commerce in locales utilizing different currencies.

The burgeoning use of the internet or other dispersed computer communications networks has created a surge in on-line sales transactions. Presently it is most common for an on-line retailer or other sales agent to conduct sales in one country with one currency risk. Few of these retailers are prepared to manage currency risk or offer their products in multiple currencies. Consequently, when they offer their product to consumers around the world, the consumers are required to pay in the retailer's local currency. It would be useful to have a product which will enable retailers or other business agents to offer prices in a variety of currencies.

As retailers or other sales agents expand to a global market spanning several countries, the sales agents will be presented with the risks associated with fluctuating currency prices. Typically, most e-commerce businesses are not well situated to adequately manage such currency risks.

Presently, credit card issuers including, for example, banks or corporate entities offer conversions for different currencies used to make an on-line sale. However, credit card arrangements do not lock in a currency price for a given period of time sufficient to enable an e-commerce retailer to sufficiently predict the impact of foreign currency exchange. In addition, a credit card issuer typically demands a relatively wide price difference for a currency exchange service, as compared to a market spot price.

It would be useful, therefore, to have a mechanism that allows an e-commerce sales agent to limit risk associated with currency exchange and also predict for a predetermined amount of time a currency price. In addition, it would be beneficial for an e-commerce sales agent to be able to negotiate a currency price based upon a projected sales volume/sales history and market data.

SUMMARY

Accordingly, the present invention provides a method and system to implement a predetermined currency price for sales which are transacted within a predetermined time period. The current invention provides for a continued risk assessment either in real time, at specified time intervals, or upon demand. A computerized communications network is used to input market data relating to a currency involved as well as sales volume transacted in that currency to calculate a current risk exposure.

Currency price can be determined with a projected sales volume as well as market data. Sales volume can be calculated, for example, by extrapolating current sales data. In addition, a currency price can be negotiated using a step model wherein a currency price is determined based upon actual sales. For example, a first currency price can be available when an aggregated sales amount total falls within a first step of between $0 and $10,000. A second currency price can be available when the sum of the aggregated sales falls within $10,001 to $100,000. Still another currency price is available for the step ranging from $100,000 to $1,000,000, etc. An electronic sales agent (e-commerce participant) can thereby be better positioned to offer a consumer competitive pricing by zeroing out the e-commerce participant's exposure to changes in currency price. In addition, the e-commerce participant and the consumer are insulated from fluctuations in a currency price.

Additionally, the present invention provides a powerful marketing tool to an electronic retailer or other sales agent. The e-commerce participant can give customers around the world a choice of currency with which the customer can consummate a transaction with, whereby the consumer is better enabled to access local markets globally. In addition, the sales agent can make a 'virtual local site,' wherein they can build a version of their online site in a local language, customized to local tastes, with all product offerings in local currency. Online sites can include for example a web site on the Internet, or an address on a proprietary network.

A retailer or other sales agent is allowed to dynamically and transparently hedge currency risk as transactions occur. A given spot price can be maintained for a predetermined period of time, for example, one week or one month. As an e-commerce participant transacts business over the course of a predetermined time period, they can inform the financial institution, thereby allowing continually updating a notional amount of trade. At the end of the predetermined time period, the total notional can be settled normally.

A close relationship between a currency exchange institution and a client is created as an e-commerce participant. An e-buyer or e-seller can give the currency exchange institution information about their historical sales patterns to determine an expected volatility and volume of transactions. In addition, the present invention can utilize direct interfaces between the system of the currency exchange institution and the e-commerce participant in order to track transactions.

The present invention includes a computer-implemented method for providing risk management for online transactions. An exchange price for a foreign currency relative to a base currency is entered into a computer. The host computer will also receive data descriptive of one or more transactions involving the foreign currency that occurred within a predetermined time period. The data will include a transaction amount. Currency is exchanged according to the entered price and the transaction amounts contained in the data. A risk exposure for the predetermined time period can be calculated based upon an aggregate amount of currency involved in transactions during the predetermined time period. The risk exposure can be based upon market data relating to the price of the foreign currency.

The present invention can be implemented to capture each transaction amount that relates to a sale occurring on an e-commerce site. Currency is automatically exchanged at the price entered for the local currency. Transactions can include an online sales transaction consummated over a network, such as a computerized communications, a retail transaction between a business and a retail customer, a business to business transaction, an online auction transaction or any other quantifiable transaction.

In one aspect of the present invention, a spot price can be derived from the market at the time of the transaction. Another aspect allows for calculating an expected average amount of base and foreign currency to exchange and entering a forward contract to the end of predetermined time period to buy a base currency and sell a foreign currency for a quantity equal to the expected average amount. Transaction amounts relating to multiple transactions can also be aggregated such that currency can be exchanged according to the entered price in an amount equal to the aggregate amount. If desired, the aggregate amount to be transacted during the predetermined time period can be limited in size.

In addition, a change in spot price of the foreign currency can be limited wherein the exchange price can be changed if spot price exceeds the limit. Alternatively, an amount can be set aside which will not be exchanged from the foreign currency to the base currency. The amount set aside can be used to cover local costs related to the business at hand.

In another aspect of the invention, a transaction can occur within a brick and mortar type retail setting or financial institutional setting.

This invention can also be embodied as a computer communications system utilizing executable software stored on a server and executable on demand via the network access device or a computer executable program code residing on a computer-readable medium.

The details of one or more embodiments of the invention are set forth in the accompanying drawings and the description below. Implementations can provide advantages such as real time calculation of risk exposure, continued risk assessment, planning capabilities for specified time period, removal of effects of currency fluctuation from consumer and e-commerce participant. A customer can record a price and be assured that the recorded price, will remain available for a predetermined time period allowed for the currency exchange rate. Other features, objects, and advantages of the invention will be apparent from the description, the drawings and the claims.

DETAILED DESCRIPTION

A currency exchange provider, or other institution that provides the service of exchanging currency, can facilitate the management of risk associated with conducting business in multiple currencies. Risk can be managed with market based pricing or with a predetermined currency pricing service. Generally, access to the risk management services is transparent to a buyer and a seller involved in an online transaction. Typically, a transaction will be consummated via a communications network by participants operating a network access device, such as a computer. In one embodiment, the present invention enables a participant in a transaction to record a price and be assured that the recorded price will remain available for the predetermined time period allowed for the currency exchange rate, thereby insulating the price from market fluctuations associated with currency exchange.

Risk management can be afforded for online or "e-commerce" transactions as well as for traditional paper based, or brick and mortar type transactions. A buyer can be a person or an entity such as, for example, a corporation or limited liability company seeking to purchase a good or service. An e-buyer is a buyer seeking to consummate a purchase via a computerized communications network, such as the Internet, or World Wide Web. Similarly, a seller can also be a person or an entity such as, for example, a corporation or limited liability company. A seller is offering a good or service. An e-seller is a seller seeking to consummate a sale via a computerized communications network, such as the Internet, or World Wide Web. Often the same person or entity can act in the capacity as both a buyer or a seller. Therefore a commerce participant is a person or entity which may act as either buyer or a seller. An e-commerce participant is a person or entity that can act in the capacity as both a buyer or a seller that seeks to consummate a transaction via computerized communications network. A customer will typically refer to a retail customer, and a client will typically refer to a person or entity that utilizes the services of a currency exchange institution.

Figure 1:
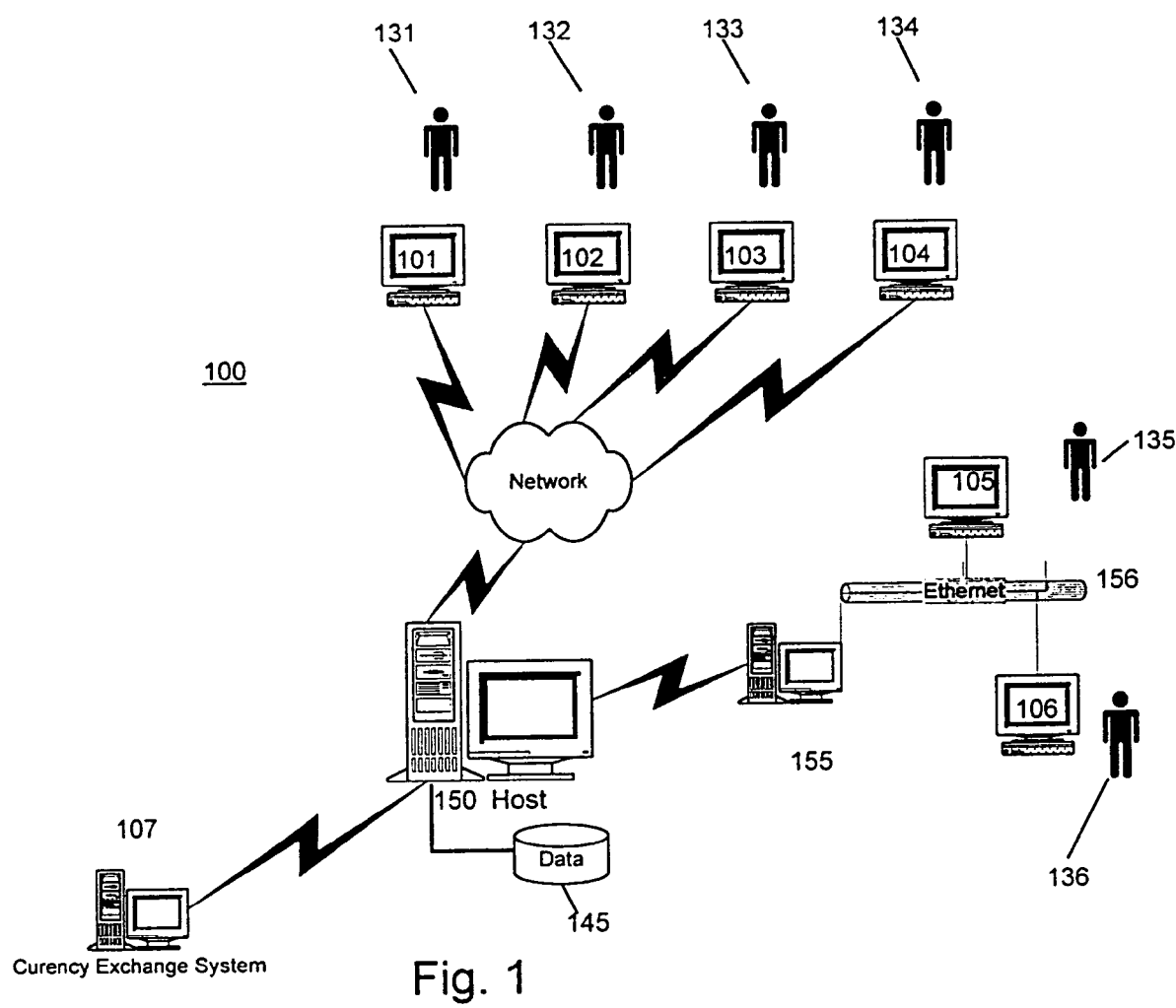
FIG. 1 illustrates the components of a computer network system which can embody this invention.

FIG. 1 shows a network of computers 100 that may be used in an implementation of an on-line sales risk management system. The network 100 can include a host system 150 and e-commerce participant computers 101–106. Each of the e-commerce participant computers includes a processor, memory, a user input device, such as a keyboard and/or mouse, and a user output device, such as a video display, flat panel display and/or a printer. The e-commerce participant computers 101–106 can communicate with the host 150 to exchange transaction information. The transaction information can be stored as data on a storage medium 145 at the host 150. In addition, a commerce participant 131–136 operating an e-commerce participant computer 101–106 may complete an online financial transaction. The online transaction can be effected with a host computer 150, or details of the online financial transaction can be transmitted to a host computer 150.

Typically, a host computer will be supported by an e-commerce participant or a financial institution. The host 150 may include multiple processing and database subsystems, such as cooperative or redundant processing and/or database servers, which can be geographically dispersed throughout the network 100. In some implementations, groups of e-commerce participant computers 105–106 may communicate with a host 150 through a local network 155. The local network 155 can also include a local server such as a proxy server or a catching server.

The host computer 150 includes one or more databases 145 storing financial transaction information and e-commerce applications. A large variety of e-commerce related files may be stored at the host 150; for example, text, audio, video, graphics, animations, and illustrations. In addition, the host 150 may interact with, and gather data from a commerce participant via an e-commerce participant computer 101–106. Data gathered from the commerce participant may be used to conduct e-commerce and/or to project future sales.

A customer can access the host 150 using software executed at an e-commerce participant's computer 101–106. The software may include a generic hypertext markup language (HTML) browser, such as Netscape Navigator or Microsoft Internet Explorer, (a "WEB browser"). The software may also be a proprietary browser, and/or other host access software. In some cases, an executable program, such as a Java™ program, may be downloaded from the host 150 to the e-commerce participant computer and executed at the e-commerce participant computer as part of the e-commerce transaction.

In general, the host computer 150 will communicate with a Currency Exchange System 107. The currency exchange system 107 will log transaction data relating to sales, or other type, of financial transaction. The currency exchange can provide a market price, or a predetermined currency price which has been programmed for a predetermined time period. In addition, the currency exchange system 107 can calculate a risk exposure based upon sales volume and market data. In one embodiment, risk calculation is performed for a given currency, using an aggregate of transactions consummated in a particular currency. In another embodiment, risk calculation is performed for an aggregate sum of transactions relating to a particular client. Other risk calculations can also be performed and are within the scope of this invention, for example a currency exchange institution may wish to calculate its entire exposure relating to all clients and all currencies.

Computers 101–107 in an Online Risk Management system may be connected to each other by one or more network interconnection technologies. For example, dial-up lines, token-ring and/or Ethernet networks 110, 140, T1 lines, asynchronous transfer mode links, digital subscriber lines (DSL), wireless links and integrated service digital network (ISDN) connections may all be combined in the network 100. Other packet network and point-to-point interconnection technologies may also be used. Additionally, the functions associated with separate processing and database servers in a host 150 may be integrated into a single server system or may be partitioned among servers and database systems that are distributed over a wide geographic area.

Figure 2:
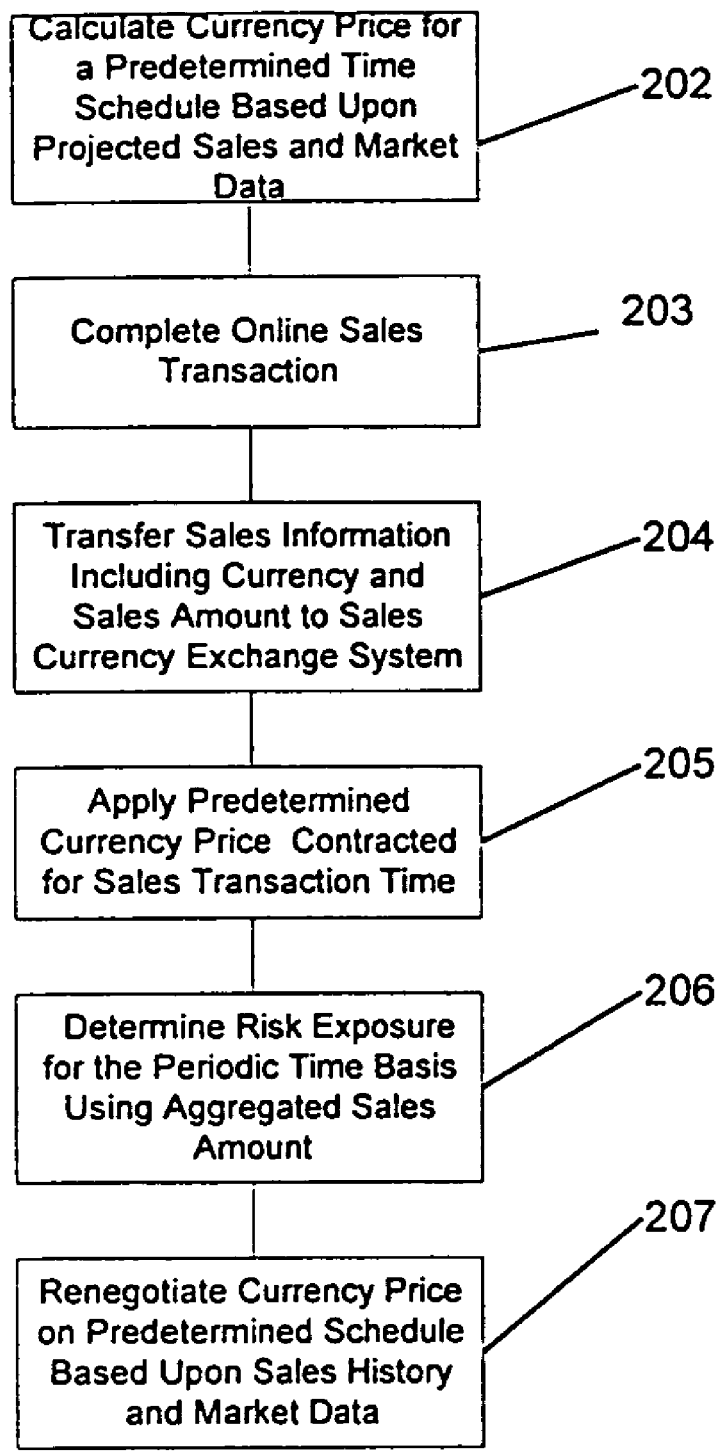
FIG. 2 is an exemplary flow of a method including a predetermined price.

FIG. 2 shows a flow of one exemplary method for providing risk management relating to an on-line e-commerce system. A currency price can be negotiated for a particular client and entered into a currency exchange system. The currency price is typically based upon projected or actual sales and market data for the particular client. However, any algorithm suitable to a particular situation can be used to determine the currency price 202. A currency price can be contractually adhered to for a predetermined time schedule.

Once a currency price has been entered 202, a commerce system can be made available to complete an on-line sales transaction 203. The present invention is particularly suitable to an on-line e-commerce system. However, other systems such as a proprietary network, or a computerized communications system utilized at a point-of-sale in a brick and mortar type sales establishment, can also be used as a vehicle to capture a financial transaction 203. In this embodiment, a price for a commodity can be guaranteed for a period of time such that when a customer consummates a sale within that period of time, the customer will receive the guaranteed price. For example, a customer an agreement for a particular price for gasoline for a predetermined period. When the customer purchases gasoline, the gas pump becomes the point of sale. The gas pump, cash register, or other point of sale register, can act as a network access device to access information on the customer and the agreement for a predetermined period. The customer is then charged at the agreement price. Similarly, other commodities, such as those used as raw materials for manufacturing can be purchased at a predetermined price, thereby eliminating the risk associated with fluctuating markets. Point of sale can therefore include any place that a deal is consummated. In this manner, purchase order terms can be negotiated in a traditional format of two humans counterparts engaged in conversation. Typically such agreements are reduced to a paper contract containing terms which can be entered into the system. The system can subsequently be accessed at a point of sale or point of delivery.

Regardless of how a transaction is completed 203, transaction information is transferred to a currency exchange system 204. Typically, the transfer is accomplished via signal on a computer communications system. The transaction information can include the currency type and amount of a particular transaction. A currency exchange system can apply a market price or a predetermined currency price contracted for the time period including the transaction time 205.

In addition, the currency exchange system can be used to determine risk exposure for a designated time period using an aggregated transaction amount 206. The time period can be, for example, a calendar day, a week or month. The time period can also be more exacting such as a number of hours, or real time. Real time can include a time period with no artificial delays other than processing time. Risk exposure can be calculated using current market data and transaction volume for a particular currency. For example, risk exposure can include an aggregate of all sales transacted in a particular currency, or an aggregate of all transactions for all currencies involved, at the current market price.

Upon expiration of a predetermined time period, a currency price can be renegotiated 207 for subsequent transactions. Typically, renegotiation of a currency price will be based upon an actual sales history and market data.

Figure 3A:
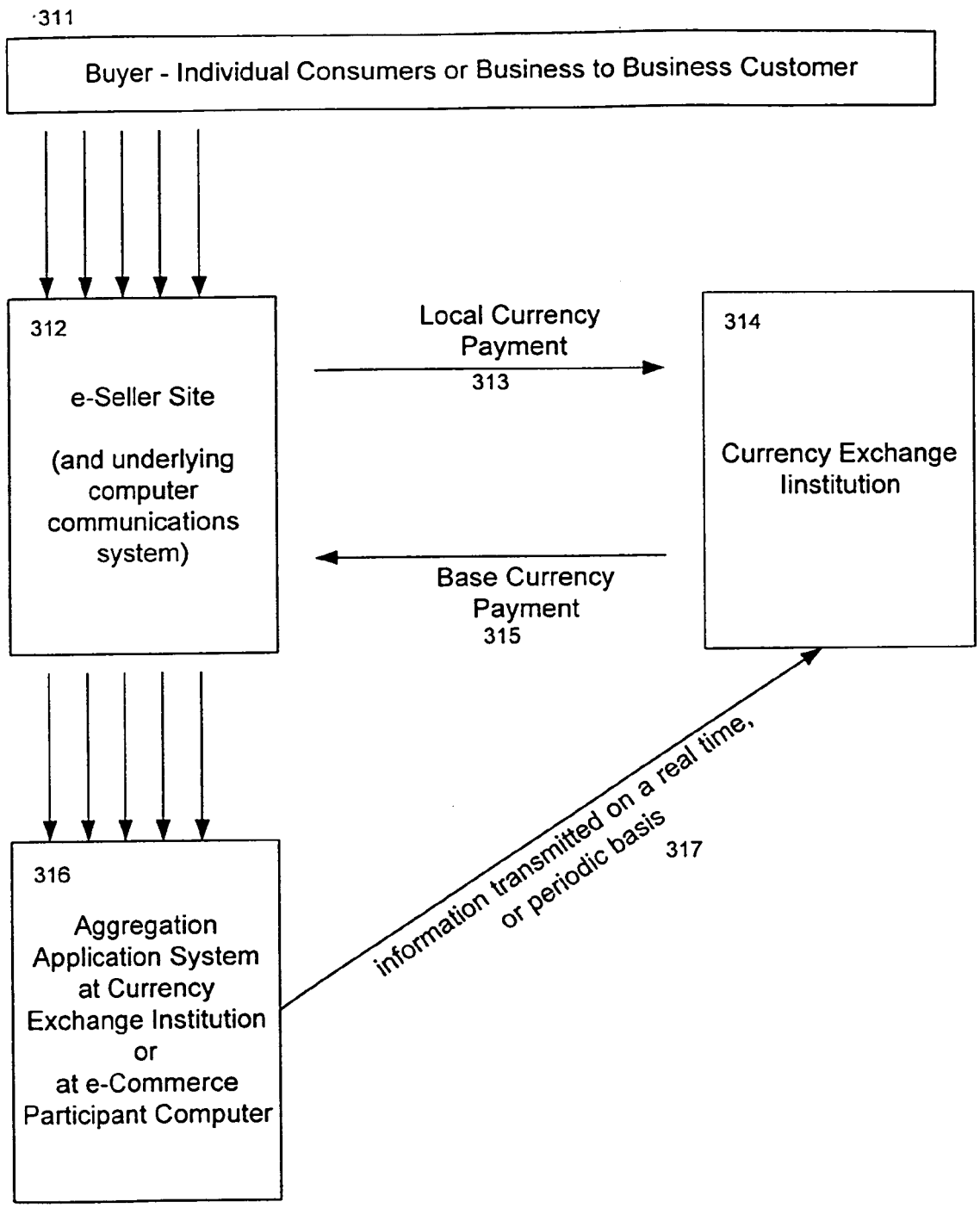
FIG. 3 illustrates a block diagram of the information exchange.

Referring now to FIG. 3a, in one embodiment of the present invention, an e-seller site 312 can be accessed by one or more buyers 311. Typically the buyer will access the e-seller site via a computer communications network 100 with a network access device 101–106. The buyer 311 can transmit a bid for a good or service offered by the e-seller site 312, wherein the bid is denominated in a currency local to the buyer 311. Typically, the bid will be sent electronically, such as through an online bid form hosted by the e-seller site 312. However, more traditional quotes, such as a verbal quote, a facsimile or a hardcopy can also be received by the e-seller site 312 and entered into an underlying computer communications system. The e-seller site 312 can transmit the bid information to a Currency Exchange Institution 314. The Currency Exchange Institution 314 can calculate and transmit the amount of the bid denominated in a currency local to the seller 312. The calculation for the currency exchange can be according to a predetermined currency price or a market price.

It may be desirous that the calculation be accomplished transparent to the buyer 311 and the e-seller site 312, wherein the buyer and seller each views a bid denominated in a currency respectively local to each. However, each bid can also be viewed with the amount denominated in a currency local to the buyer and denominated in a currency local to the seller displayed side by side. Bids can also be ranked and viewed amongst other received bids.

Figure 3B:
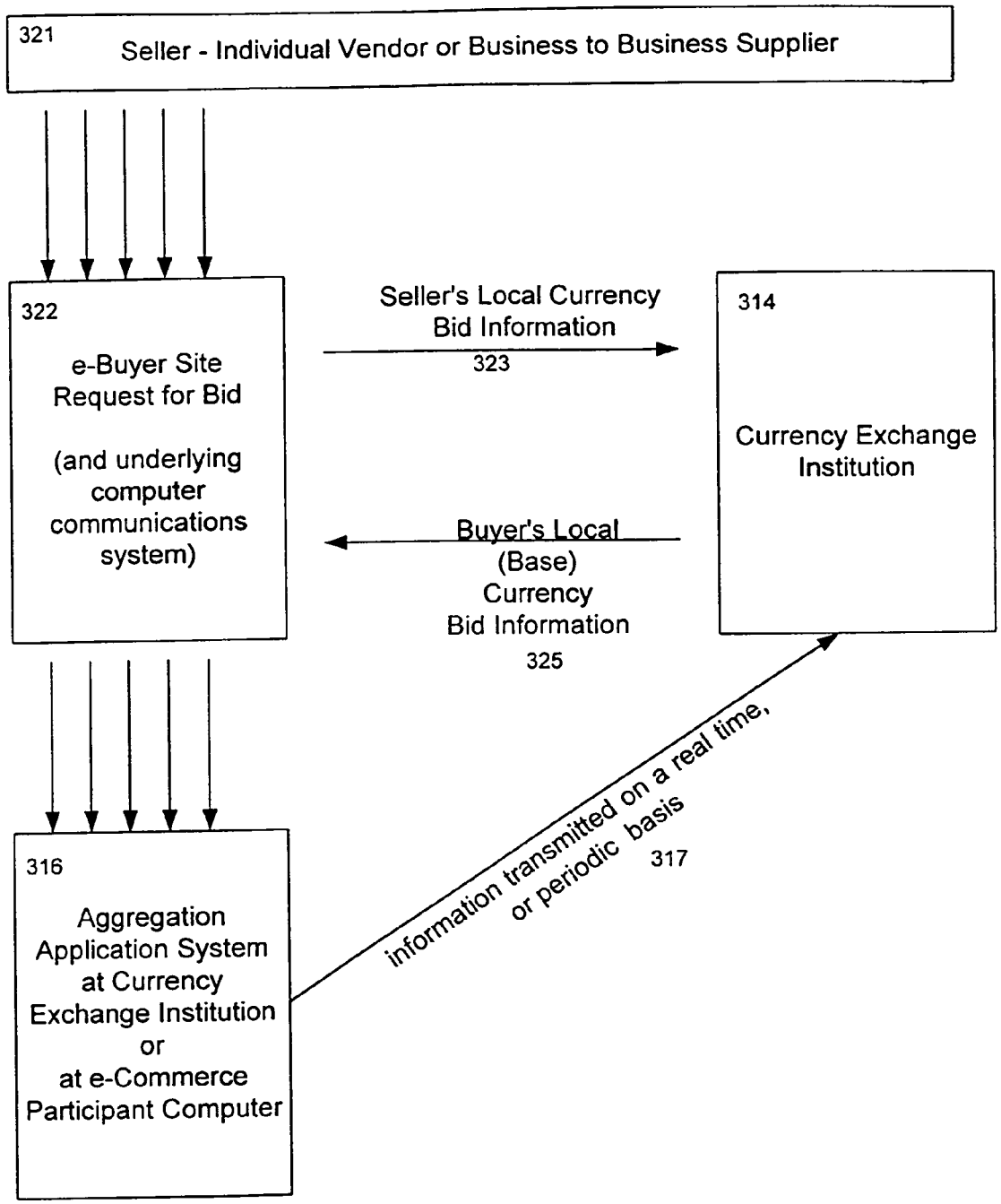

Embodiments can also include a buyer that is an individual consumer or a corporate entity which accesses an Internet e-commerce site to purchase a good or service, wherein the good or service has been priced in the buyer's local currency. Referring now to FIG. 3b, another embodiment of the present invention allows a seller 321 to access an e-buyer site 322. The embodiment is particularly useful to address the needs of a corporate buyer. The corporate buyer, or a private individual, can post their current needs on an e-commerce site acting as an e-buyer site. For example, current needs can be displayed as a request for bids on a required good or service. An e-seller 321 can submit a quote, or other offer to sell to the e-buyer site 322. Typically, the quote will be sent electronically, such as through an online bid form hosted by the e-buyer site 322. However, more traditional quotes, such as a verbal quote, a facsimile or a hardcopy can also be received by the e-buyer site 322 and entered into an underlying computer communications system.

The e-buyer site 322 can transmit the bid information to a Currency Exchange Institution 314. The Currency Exchange Institution 314 can calculate and transmit the amount of the bid denominated in a currency local to the buyer 312. The calculation for the currency exchange can be according to a predetermined currency price or a market price.

In one embodiment, it may be desirous that the calculation be accomplished transparent to the seller 321 and the e-buyer site 322, wherein the buyer and seller each views a bid, and its ranking amongst other received bids, only in a currency local to each entity. In another embodiment, each bid might be viewed with the amount denominated in a currency local to the buyer and denominated in a currency local to the seller displayed side by side.

Embodiments can also include a seller that is an individual consumer or a corporate entity which accesses an Internet e-commerce site to sell a good or service, wherein the good or service has been priced in the seller's local currency.

Figure 4A:
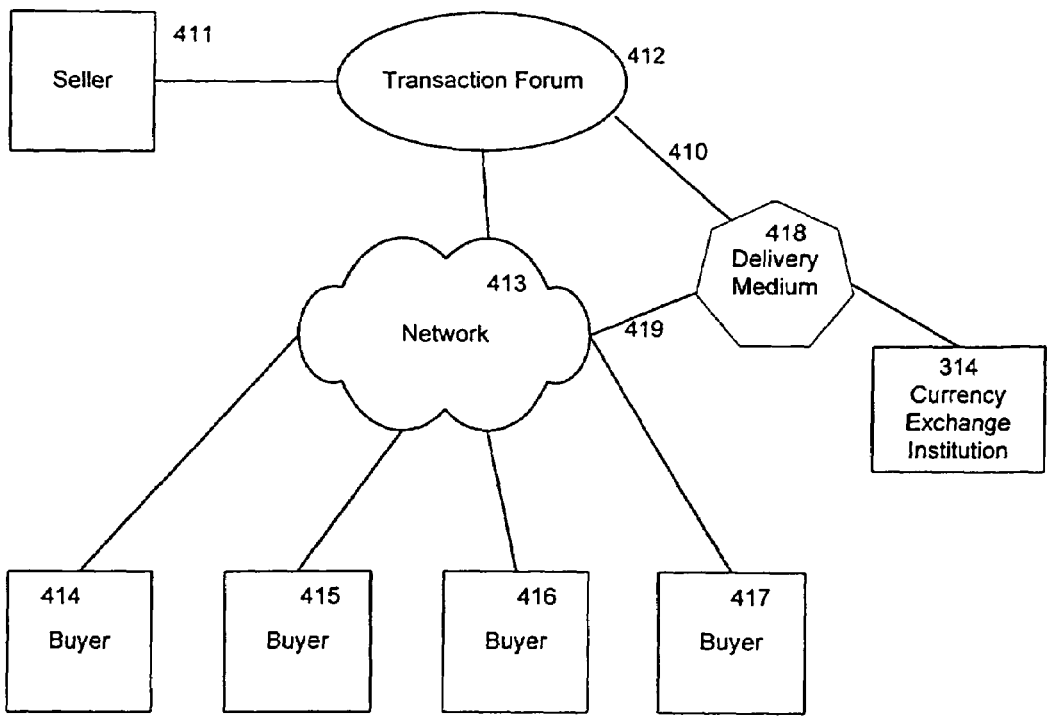
FIG. 4a is a block diagram illustrating a seller oriented embodiment of the invention.

Referring now to FIG. 4a, a block diagram illustrates an embodiment of the invention. A seller 411 communicates with one or more buyers 414–417 via a communications network 413. The seller 411 can facilitate the communication by hosting a transaction forum 412. Typical transaction forums include an Internet site, a proprietary network or a dial up network, although other types of forums are within the scope of the invention. Details of a transaction involving the seller 411 and a buyer 414–417 are communicated to a Currency Exchange Institution 314 via a delivery medium 418. The delivery medium can include, for example, a host computer 150, a network interface, a router or any other electronic medium capable of interfacing between the transaction forum and the Currency Exchange Institution. The delivery medium 418 can communicate via a link 419 with the communications network 413, or be directly connected to the transaction forum 412, such as, for example, through a direct feed 410.

Figure 4B:
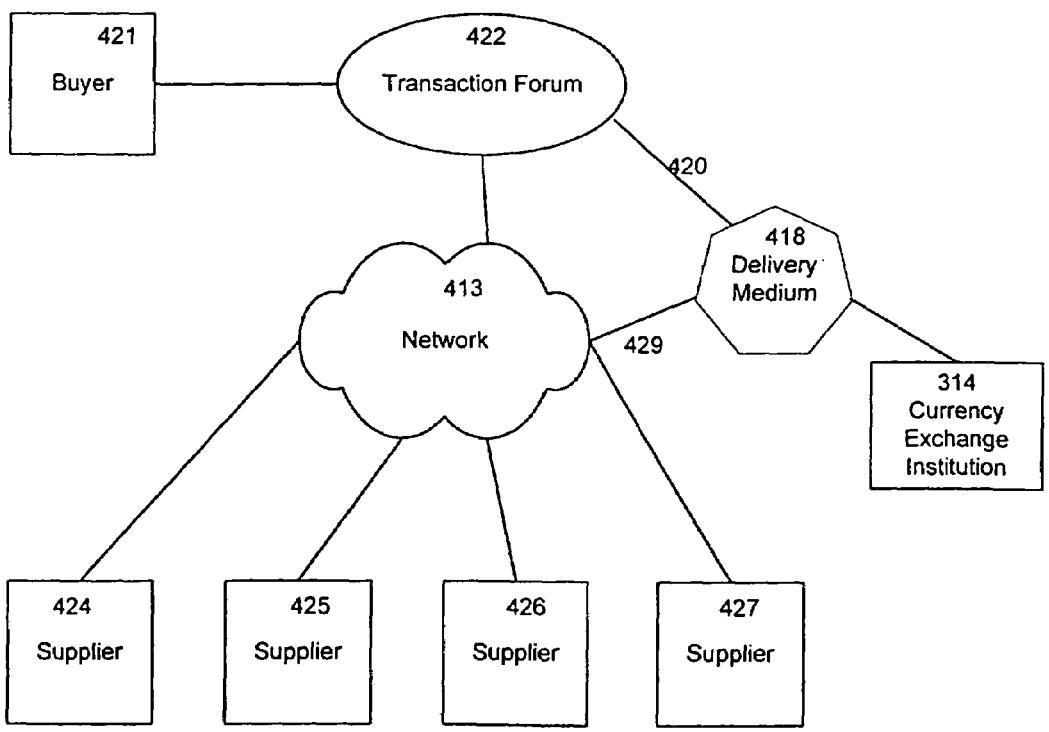
FIG. 4b is a block diagram illustrating a buyer oriented embodiment of the invention.

Similarly, as depicted in FIG. 4b, a buyer 421 can initiate a transaction and communicate with one or more suppliers 424–427. The buyer 421 can communicate with one or more suppliers 424–427 via a communications network 413. The buyer 421 can facilitate the communication by hosting a transaction forum 422. Typical transaction forums include an Internet site, a proprietary network or a dial up network, although other types of forums are within the scope of the invention. Details of a transaction involving the buyer 421 and a supplier 424–427 are communicated to a Currency Exchange Institution 314 via a delivery medium 418. The delivery medium 418 can communicate via a link 429 with the communications network 413, or be directly connected to the transaction forum 422, such as for example, through a direct feed 420.

Figure 5:
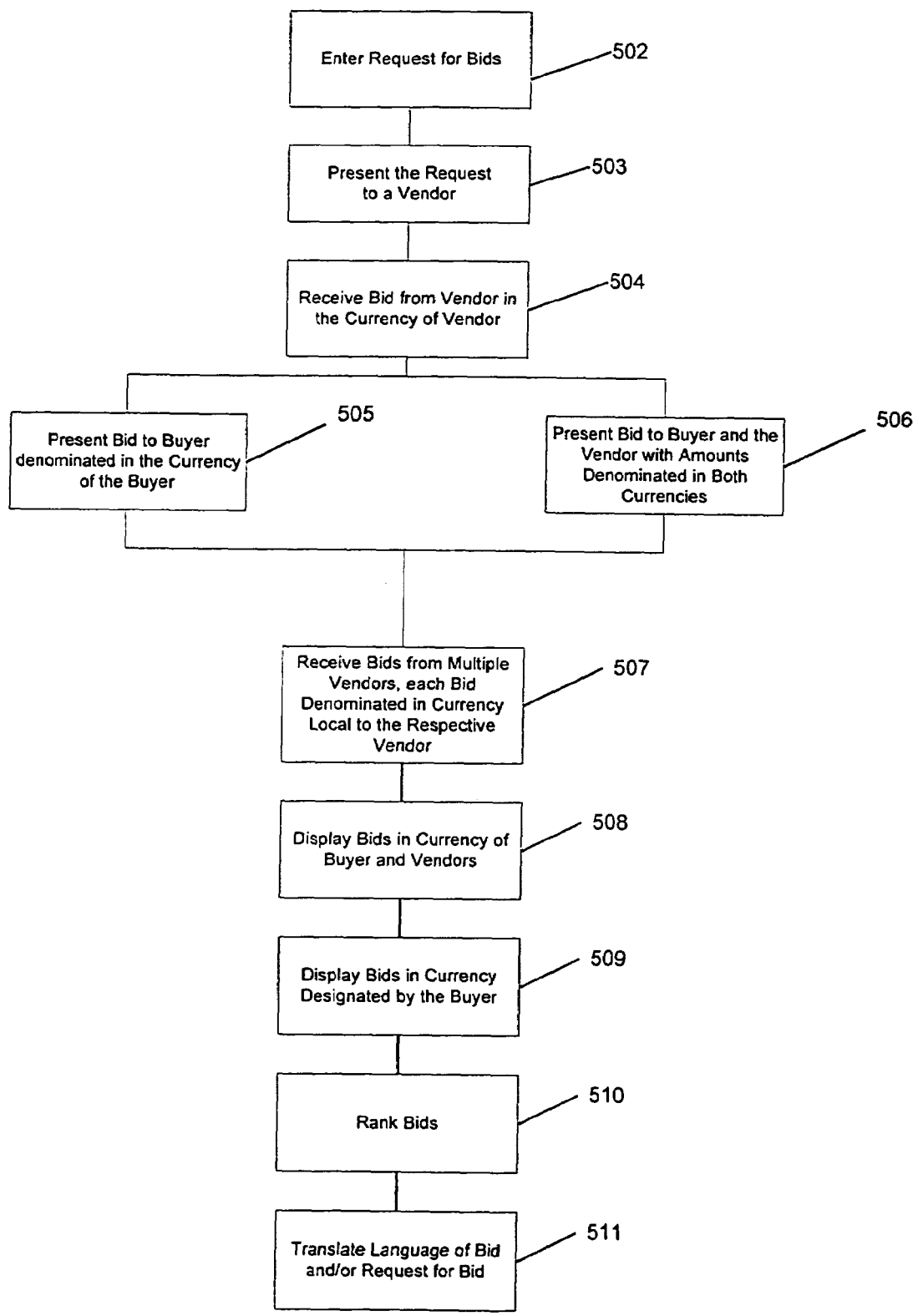
FIG. 5 is an exemplary flow of a method including bid fulfillment.

A flow chart depicting the steps a buyer can implement is shown in FIG. 5. The buyer can enter into the system a Request for Bids 502 relating to a need of the buyer. The need can be for a particular part and a quantity desired, a service to be rendered, a security, a currency exchange, or almost any type of business transaction. The system can present the request to one or more vendors 503. In a preferred embodiment, the presentation 503 will be accomplished via a transaction forum 412 such as an Internet web site. However, other forms of presentation can also be utilized, such as, for example, publication in newspapers or other media, direct mail, e-mail, oral conveyance and other well known methods of business correspondence.

A bid from a local vendor can be entered into the system and received by the buyer 504. The system is capable of receiving a bid denominated in a currency local to the vendor 504 and presenting the bid to the buyer denominated in a currency local to the buyer 505. In one embodiment, the bid can be presented to the buyer and the local vendor in amounts denominated in both currencies 506. In addition, bids can received from multiple vendors, each bid denominated in a currency local to the respective vendors 507. The system can display the bids in both currency in which the bid was received and the currency local to the buyer 508. The buyer can also designate a currency in which it would like to conduct its business even if it is not the currency local to the buyer 509. For example, an international corporation may wish to conduct its business in U.S. Dollars, even if a transaction is local to Germany. In this example, the "Currency local to the buyer" can be designated as U.S. Dollars and the system will present bids to the buyer in U.S. Dollars. Bids can also be ranked according to criteria specified by the buyer, including the most economical bid, or the chronological receipt of bids 510. A bid determined to be the most favorable by the system can also be color enhanced or otherwise designated.

In another aspect of the present invention, language included in a request for bid and/or language included in a bid can also be translated by the system 511. Software providing for language translation is well known and can be conveniently incorporated into the system of the present invention. The translation can allow for global participation in business to business or other transactions with increased convenience to the participants. Each participant, such as the buyer and the seller can enter descriptive information into the system in a currency and language desired by a first participant and the system can present the information to a second participant with amounts denominated in a second currency and translated into a second language.

Figure 6:
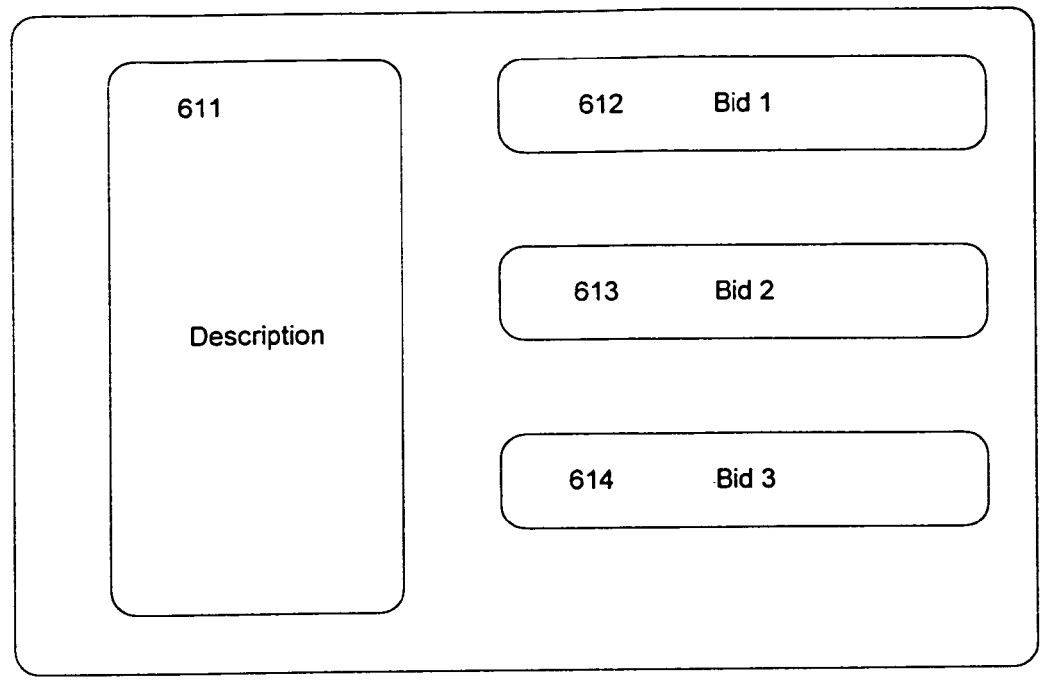
FIG. 6 illustrates an exemplary interface displaying bids.

Referring now to FIG. 6, a user interface 610 utilized by the present invention can include a portion of a display screen containing a description 611. The description can include information relating to a bid, a request for bid, or any other information relating to a transaction. The description portion of a display interface can be translated by the system into a language desired by a viewer of the interface. The user interface 610 can also include bid information 612–614. The bid information can include an amount of a bid, or an amount a buyer is willing to pay for a need. The bid information 612–614 can be denominated in a currency desired by a viewer, or denominated in an amount desired by the originator of the information, if the originator is not the viewer. For example, the viewer may be the buyer and the amounts may be viewed in the currency of an originator such as a bidder. Bid information 612–614 can also be ranked. Ranking can occur according to predetermined criteria, criteria input by a viewer, or other criteria entered into the system.

Figure 7:
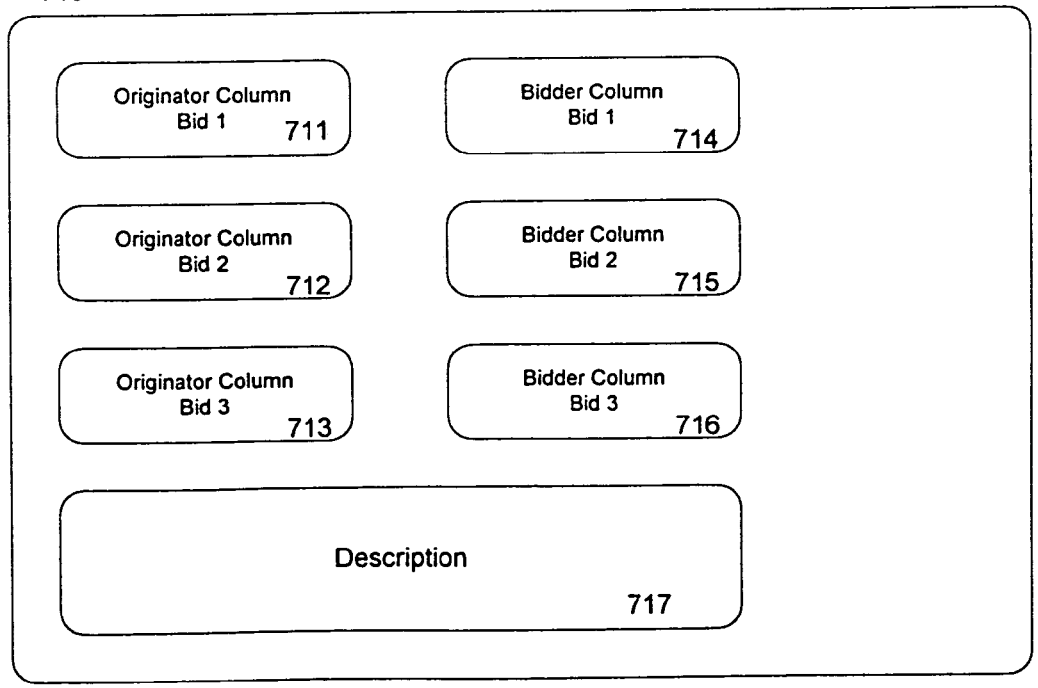
FIG. 7 illustrates and exemplary interface with originator and bidder information.

An alternate user interface 710 that can be utilized by the present invention is depicted in FIG. 7. The alternate user interface 710 can include an originator column of bid information 711–713 and a bidder column of bid information 714–716. Each column can display information in a currency and language local to, or otherwise desired by the originator or bidder. The originator is typically a buyer or seller depending on the nature of the transaction. The bidder can be a counterparty responding to an offer put forth by the originator. A descriptive portion 717 can also be included in the alternate user interface 710.

Upon consummation of a transaction, such as a sale, a e-seller site 312, an e-buyer site 322, a transaction forum 412 or other e-commerce participant hosting an e-commerce site, can transmit notification of the transaction to a currency exchange server related to a currency exchange institution, thereby updating the server on the notional in local currency. The notification can be real-time or periodic. The e-commerce participant exchanges a local currency quantity equal to an aggregate of all sales for the specified time period with the currency exchange institution at a predetermined fixed exchange rate. A total exchange may be accomplished via multiple exchanges, for example daily exchanges, throughout the predetermined time period. The predetermined fixed exchange rate can be negotiated with the currency exchange institution at the beginning of the specified time period and remain good for the duration of the time period.

The currency exchange institution can also send the e-commerce participant one payment in their pre-specified base currency, following normal spot settlement conventions, t+2 in most instances, or settled on an agreed upon date, such as a forward date of t+5 wherein t represents the time of the transaction. The base currency will typically be the currency local to the e-commerce participant, although it can also be another currency if desired.

Another embodiment can include a similar technology but with a price for a given transaction that reflects market price for the time of an e-commerce transaction. Still another embodiment can include prices specified according to a predetermined pricing algorithm, such as one that includes market data.

In one aspect of the invention, an interface to an online auction site, such as those well known on the world wide web (WWW) or any other known auction protocol, can enable global auctions where bidders bid in local currencies and the auction site accurately determines a winner in a seller's currency. This enables both bidders and sellers to better realize the implications of the transaction. Enablement of this aspect can include an automatic posting online wherein the bid price is denominated in the currency local to the bidder as well as a posting denominated in the currency local to the seller. The postings can be accomplished in real time allowing all participants to understand the value of each bid. The exchange rate can also be included in the determination of a winning bid. Each participant in the auction can retrieve the bidding information relating to the auction and display the bid in a currency local to each participant and a currency local to the seller. In one embodiment, the seller's currency can be referred to as the "base" currency and the bidders currency referred to as the "foreign" currency.

In another aspect of the invention, a hedging strategy can relate to a standard contract wherein a market rate is fixed for a "reset period," and is not changed until the next reset period. This scenario can assume no constraints on notional amount. In another variation, an upper and/or lower limit is fixed on the notional amount.

One embodiment includes a currency exchange institution entering into a single forward contract until the end of the reset period to buy base currency, or the currency native to the seller, and sell foreign currency, wherein m=# of exchange periods in a reset period. One forward contract settles at the end of each exchange period and is put on with a quantity of foreign currency equal to the expected average amount for that exchange period.

Another alternate embodiment allows the currency exchange institution to enter into a single forward contract at the beginning of each reset period. At the end of the reset period the currency exchange institution can buy base currency and sell foreign currency. The foreign currency notional of the forward contract is calculated as:

Formula $$N_{tot} = \sum_{i=1}^{m} N_0(i)/D_F(i)$$

where $N_o(i)$=expected currency notional for exchange period i.

$D_f(i)$="forward" discount factor in the foreign currency from the end of exchange period i to the end of the reset period.

m=# of exchange periods per reset period.

Other embodiments allow the currency exchange institution to buy straddles around the average forward, one expiring each day of the reset period, with notional on the $i^{th}$ straddle equal to the formula:

$$\alpha(i) N_o(i)$$

wherein $N_o(i)$, where $N_o(i)$=expected average foreign currency notional for $i^{th}$ or $o^{th}$ period, and $\alpha(i)$=standard deviation of the $i^{th}$ notional as a fraction of $N_o(i)$. This straddle buying strategy can also be applied to the second alternate embodiment.

In addition, the currency exchange institution can buy a single straddle that expires at the end of the reset period, with notional of:

$$N_{tot} = \sum_{i=0}^{n} \alpha(i) N_0(i)/D_F(i)$$

In another aspect of the invention, limiting the notional may attach limits to the transactional size that can be transacted over a given period. In addition, limiting the size of spot movements—i.e., if spot moves more than x% over the fixed time period (one week, one month, etc.) the currency trading institution can reserve the right to change the exchange rate. A sales agent may be contractually required to process all transactions to the currency trading institution, wherein they do not try to arbitrage the rate by doing more or fewer transactions based upon where the exchange rate is and it not being a reflection of the underlying sales from business. In one embodiment, a computerized system automatically monitors each transaction by receiving a data feed as each transaction is completed.

Typically, in each period Δt, a sales agent will exchange an unknown notional amount. The present invention will convert it at an agreed spot rate $S_a$. This spot rate is reset every m "exchange periods". (For example this period $T_p$=mΔt can be called the reset period.)

This can continue for n reset periods; the total contract period $T_c = T_p = mn\Delta t$. An example edge that can be required in reset spot could be set forth as:

$$\epsilon = \kappa \propto \sigma \sqrt{\frac{\Delta t(m+1)}{2nm\left(1 - \frac{\kappa^2 \alpha^2}{nm}\right)}}$$

where $\epsilon$=spot edge and is defined by $S_a$=spot for a reset period=$S_o$ $(1-\epsilon)$ where $S_o$=average forward (averaged over the m exchange dates)

$\alpha$=estimated standard deviation of currency notional amounts (each $\Delta t$) as a fraction of the average currency notional $\sigma$=estimated volatility of the spot exchange rate $\Delta t$=length (in time) of each exchange period m=# of exchange periods in a reset period n=# of reset periods in the contract period $k=N^{-1}$ (P) where P=probability the currency exchange institution will make money in the contract period; here, $N^{-1}$ (x)=inverse cumulative standard normal distribution.

Notional information requires intimate knowledge of a sales agent's past sales figures to predict mean and standard deviation of future sales. Actual sales data is most accurate; however, a sales agent's revenue predictions can also be used.

In still another aspect, a credit card company may pay receipts directly into a currency exchange institution bank account on a retailer's or other online sales agent's behalf. The currency can then be converted into a currency of the client's choice. Preferably, the converted currency is agreed upon in advance, although an exchange institution can also provide a selection of available currencies with an exchange rate for each currency. In addition, by arrangement, a portion of receipts may not be converted into currency of client's choice, but instead may be retained in an amount to cover taxes and expenses in a local currency.

In one embodiment, this present invention can be utilized in conjunction with a brick and mortar type retailer or financial institution. Brick and mortar establishments can be embodied by the well-known physical storefront scenario into which a customer enters to make a transaction. The transaction may include a retail purchase, a banking transaction, a catalog purchase, a standing order or any other type of transaction, which entails a transfer of currency. Other brick and mortar establishments can include a credit card company, a regional bank, or other suitable enterprise.

To facilitate operational and accounting aspects of the present invention, a client may be required to transfer currency receivables, usually payable by a third-party credit card company, to the Currency Exchange Institution. These monies may be paid to the existing Currency Exchange Institution bank accounts wherein they can be credited to the client's account on Currency Exchange Institution books. An additional special purpose bank account to facilitate this process can also be opened. On a regular basis, a Currency Exchange Institution can receive notification from a client or from a third party such as a credit card company relating to an amount of currency receivables to be transferred. Notification and transfer may be on a daily basis, but also may be periodic, such as weekly or monthly. If desired, it can be presumed that each payment date will be a valid banking business day in the local country of the currency being transferred. Alternatively, a global type transaction may make transfer available 24 hours a day each day of the year more desirable. Notification would preferably be electronic, but may be verbal, written or otherwise. If electronic, notification may be communicated to the Currency Exchange Institution via a direct communication over a private network, virtual private network, distributed network, API, flat file, or any other electronic means arranged between the Currency Exchange Institution and the client.

Upon notification, a Currency Exchange Institution's local agent bank can be notified of anticipated receipts. The receipts can be credited to the client's account with the Currency Exchange Institution. If accounting, or other reason, determines that it would be favorable to credit these monies to an internal Currency Exchange Institution account, this type of credit can also be facilitated.

A balance can be tracked, on a daily basis or otherwise, by the Currency Exchange Institution's accounting sub-ledger or an e-commerce participant's computer 101–106. The e-commerce participant's computer 101–106 can have the ability to track balances, provide periodic statements, accrue and report interest, and alert individuals of negative balances. At the time of the periodic rate fixing/reset and the settlement of a previous period's cash flow, a holding account can be debited the sum total of the previous period's receipts and credited with the counter-currency payable to the client. This money can be held on account with a Currency Exchange Institution, or can be payable, on demand or on a pre-arranged basis, to the client. In addition, interest may be paid to or received from the client on balances held at the Currency Exchange Institution.

Other variations can include an e-commerce participant choosing to send one payment to a Currency Exchange Institution out of an e-commerce participant's own local bank account, or out of a third-party account. Alternatively, payments on e-sales transactions may be made directly into a Currency Exchange Institution bank account in a local country of operation.

Exchanges of currency may occur more frequently than the time period for which a fixed exchange rate has been set. They may occur as every transaction takes place, daily, weekly, monthly, etc. (e.g., "real time") as long as it is within the time period to which the fixed exchange rate applied. Alternatively, exchanges may occur, but are not limited to, when a certain local currency notional amount is reached or a certain number of transactions take place.

In some instances, a Currency Exchange Institution can bear a day credit exposure to the e-commerce participant. However, in other instances, a Currency Exchange Institution may bear credit exposure to the underlying consumer or, in a business to business environment, to a corporate purchaser of goods and/or services on an e-retail site. In the future, this counterparty credit risk may be securitized and sold to a third party.

Technology used to implement aggregation on the client side can include software which can be based on a Currency Exchange Institution's UNIX/Windows NT risk management system. One embodiment can allow the aggregation system to be entirely controlled by the client. Appropriate safeguards can be put in place to discourage a client from arbitraging exchange rates. Alternatively, the client and a Currency Institution may jointly monitor the aggregation of transactions in a database, or as notional data is determined, it can be fed directly to a Currency Exchange Institution implementing this invention.

Transmission of aggregation data from the client to a currency exchange provider or other institution that provides the service of exchanging currency can be accomplished with a distributed network such as the Internet manually, over the telephone or email via proprietary API or in a standardized format (standard text formatted in a pre-agreed way). Additionally it may be passed directly into an electronic trading system via an electronic format.

Trading can be based on aggregate currency notional data. A decision to trade may be entirely manual (aggregate data passed to a trader manually or electronically), or may happen automatically, with aggregate notional data passed into an electronic trading system.

Determination of contract exchange rates can be accomplished manually or automatically off a pre-specified fix.

Expected notional, and thus pricing, can be based upon predictions of an e-commerce participant's future revenue. In another aspect, to engage in this function within applicable banking laws the entire product may be securitized. Notional predictions can also be predicated upon seasonal, calendar or other cyclical criteria.

In other embodiments, a netting arrangement can be implemented wherein a customer can receive a rebate based upon the sum totals of each currency exchanged at the end of a predetermined time period. The rebate can be given for one currency netting against another currency. For example, if a customer has a retail scenario which calls for 100 £ Sterling to be converted to U.S. Dollars at the end of a month, and the same customer's retail scenario also calls for 90 Eurodollars to Sterling, the netting arrangement may only call for 10 £ Sterling to be converted to U.S. Dollars. In one embodiment, a netting arrangement can allow for the rebate to be saved to the last transaction of the month such that the exchange rate can be modified for that transaction to reflect the rebate.

Retail exchange rates can also be associated with particular products. A customer may negotiate different contract expiration dates for an exchange rate for different products. For example, a particular customer may be involved in selling automobiles as well as automobile parts. In order to properly accommodate the difference in price between the automobile and the automobile parts, and the conceivable resultant exposure, separate expiration dates for a guaranteed exchange rate can be implemented for each product.

A spot transaction rate or a market transaction rate can also be implemented for each transaction wherein a floating transaction rate for a given point in time is applied to each transaction occurring at that point in time.

The invention may be manifested in digital electronic circuitry, or in computer hardware, firmware, software, or in combinations of them. Apparatus of the invention may also be implemented in a computer program product tangibly embodied in a machine-readable storage device for execution by a programmable processor; and method steps of the invention may be performed by a programmable processor executing a program of instructions to perform functions of the invention by operating on input data and generating output.

One or more computer programs can be executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments of the present invention have been described. Nevertheless, it will be understood that various modifications may be made without departing from the spirit and scope of the invention. For example, computers 101–106 can comprise a personal computer executing an operating system such as Microsoft Windows™, UniX™, or Apple MacOS™, as well as software applications, such as a web browser. Customer computers 101–106 can also be terminal devices, a palm-type computer web access device that adhere to a point-to-point or network communication protocol such as the Internet protocol. Other examples can include TV web browsers, terminals, and wireless access devices (such as a 3-Com Palm VII organizer). A customer computer may include a processor, RAM and/or ROM memory, a display capability, an input device and hard disk or other relatively permanent storage. Accordingly, other embodiments are within the scope of the following claims. Similarly, the host system 150 and the currency exchange system can be any computer system known to those skilled in the art.

What is claimed is:

1. A computerized apparatus system for facilitating management of risk associated with conducting a transaction for at least one of goods and services, said transaction conducted in multiple currencies, and said computerized apparatus system comprising:

a host computer comprising a processor and a storage for digital data; and executable software stored on the host computer storage and executable on demand, the software operative with the host computer processor to cause the host computer to:

store in the host computer storage digital data identifying a seller of at least one of: goods and services;

store in the host computer storage digital data descriptive of a currency exchange price that relates a base currency to a foreign currency and which is effective for currency amounts involved in multiple transactions comprising at least one of goods and services, sold by the seller and based upon a projected amount of sales received;

indicate in the host computer storage a predetermined period of time during which the currency exchange price is effective for amounts exchanged as a result of multiple transactions involving the sale of at least one of: goods and services, sold by the seller;

receive into the host computer storage digital data descriptive of multiple executed transactions, wherein the digital data descriptive of the multiple executed transactions comprises an indication that the transactions involved at least one of: goods and services sold by the seller, and wherein the digital data additionally comprises an amount of foreign currency involved in the multiple transactions and the date each of the multiple transactions were executed;

determine that one or more of the executed transactions were executed during the period of time during which the currency exchange price is effective; and calculate an amount of foreign currency to be exchanged according to the currency exchange price based upon the amount of foreign currency transacted in the one or more transactions executed during the period of time during which the currency exchange price is effective; and an e-commerce participant computer comprising a processor and a storage; and executable software stored on the e-commerce participant computer storage and executable on demand, the software operative with the e-commerce participant computer processor to cause the e-commerce participant computer to:

calculate the projected amount of sales which will be transacted by the seller during the period of time during which the currency exchange price is effective;

transmit the projected amount of sales to the host computer;

receive the currency exchange price that relates a base currency to a foreign currency which is effective for one or more transactions involving the sale of at least one of: goods and services, sold by the seller; and calculate a sale price for at least one of: a good and service wherein the sale price is denominated in a foreign currency and based upon the currency exchange price.

2. The computerized apparatus system of claim 1 additionally comprising software operative with the e-commerce participant computer processor to cause the e-commerce participant computer to transmit an offer to sell the at least one of: a good and service, for the calculated sale price denominated in a foreign currency and based upon the currency exchange price.

3. The computerized apparatus system of claim 1 additionally comprising software operative with the host computer processor to cause the host computer to determine a risk exposure for the time during which the currency exchange price is effective based upon the projected amount of sales which will be transacted by the seller.

4. The computerized apparatus system of claim 1 wherein the digital data descriptive of one or more executed transactions comprises data descriptive of each transaction executed on a particular website.

5. A computerized apparatus system for facilitating management of risk associated with conducting a transaction for at least one of goods and services, said transaction conducted in multiple currencies, and said computerized apparatus system comprising:

a host computer comprising a processor and a storage for digital data; and executable software stored on the host computer storage and executable on demand, the software operative with the host computer processor to cause the host computer to:

store in the host computer storage digital data identifying a seller of at least one of: goods and services;

store in the host computer storage digital data descriptive of a currency exchange price that relates a base currency to a foreign currency and which is effective for currency amounts involved in multiple transactions comprising at least one of goods and services, sold by the seller;

indicate in the host computer storage a predetermined period of time during which the currency exchange price is effective for amounts exchanged as a result of multiple transactions involving the sale of at least one of: goods and services, sold by the seller;

receive into the host computer storage digital data descriptive of multiple executed transactions, wherein the digital data descriptive of the multiple executed transactions comprises an indication that the transactions involved at least one of: goods and services sold by the seller, and wherein the digital data additionally comprises an amount of foreign currency involved in the multiple transactions and the date each of the multiple transactions were executed;

determine that one or more of the executed transactions were executed during the period of time during which the currency exchange price is effective;

calculate an amount of foreign currency to be exchanged according to the currency exchange price based upon the amount of foreign currency transacted in the one or more transactions executed during the period of time during which the currency exchange price is effective;

receive into the host computer storage digital data descriptive of a projected amount of sales from one or more sellers; and calculate a forward contract amount comprising an exchange of the base currency and the foreign currency, based upon an aggregate of the projected amounts of sales received.

6. The computerized apparatus system of claim 1 wherein the software is additionally operative with the host computer processor to cause the host computer to:

indicate in the host computer storage a limit of an aggregate amount of currency which will be exchanged at the currency exchange price during the period of time during which the currency exchange price is effective;

track the aggregate amount of currency to be exchanged at the currency exchange price during the period of time during which the currency exchange price is effective; and provide an indication of whether the limit of an aggregate amount of currency has been reached.

7. The computerized apparatus system of claim 1 wherein the software is additionally operative with the host computer processor to cause the host computer to:

receive digital data comprising a spot price for converting the foreign currency to the base currency from a foreign exchange market on each respective day that each of the one or more transactions is executed;

store the digital data comprising a spot price in the computer storage; and compare the spot price to the currency exchange price effective for the one or more transactions.

8. A computer implemented method for managing the impact of foreign exchange on the sale of one or more of goods and services in an online transaction, the method comprising the steps of:

receiving digital data into a computer storage, the digital data indicative of a currency exchange price that relates a cost to exchange a foreign currency into a base currency, wherein the currency exchange price will be adhered to by a currency exchange provider for currency amounts involved in multiple transactions comprising one or more of: goods and services offered for sale by a particular seller;

storing digital data in the computer memory comprising a price for one or more of: goods and services, wherein the price is denominated in the base currency;

inputting into the computer storage digital data comprising a predetermined period of time during which the currency exchange price will be adhered to by the currency exchange provider for currency amounts involved in one or more transactions comprising the one or more of: goods and services offered for sale by the particular seller, and executed during the predetermined period of time;

calculating a selling price with a processor operative with executable software, the selling price comprising a price for the one or more of: goods and services, denominated in the foreign currency and based upon the price for the one or more of: goods and services denominated in the base currency and the currency exchange price; and outputting digital data comprising an offer for sale for the one or more of: goods and services, wherein the offer for sale comprises the selling price denominated in the foreign currency and an offer time period during which the offer for sale is available, wherein the offer time period is based upon the predetermined period of time during which the currency exchange price will be adhered to by the currency exchange provider;

calculating with the processor, a projected amount of currency involved in online sales executed by the seller during the period of time which the currency exchange price will be adhered to by a currency exchange provider; and transmitting digital data to the currency exchange provider comprising the projected amount of currency involved in online sales during the period of time which the currency exchange price will be adhered to by the currency exchange provider, wherein the currency exchange price is based upon the projected amount of currency involved in online sales during the period of time which the currency exchange price will be adhered to by the currency exchange provider.

* * * * *